(12) United States Patent
Fuller

(10) Patent No.: US 12,548,252 B2
(45) Date of Patent: Feb. 10, 2026

(54) PRECOMPUTED TOPOLOGY FOR REALTIME RAY TRACING

(71) Applicant: Microsoft Technology Licensing, LLC, Redmond, WA (US)

(72) Inventor: Martin Jon Irwin Fuller, Warwickshire (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 18/391,419

(22) Filed: Dec. 20, 2023

(65) Prior Publication Data

US 2025/0209741 A1 Jun. 26, 2025

(51) Int. Cl.
*G06T 17/00* (2006.01)
*G06T 15/06* (2011.01)
*G06T 17/20* (2006.01)

(52) U.S. Cl.
CPC ............ *G06T 17/005* (2013.01); *G06T 15/06* (2013.01); *G06T 17/20* (2013.01); *G06T 2210/21* (2013.01)

(58) Field of Classification Search
CPC ....... G06T 17/005; G06T 15/06; G06T 17/20; G06T 2210/21
See application file for complete search history.

(56) References Cited

U.S. PATENT DOCUMENTS

| 2018/0253867 A1* | 9/2018 | Laroche | G06T 17/20 |
| 2023/0118972 A1* | 4/2023 | Wald | G06T 17/10 |
|  |  |  | 707/778 |
| 2024/0037840 A1* | 2/2024 | Ramesh Babu | G06T 17/10 |
| 2024/0153208 A1* | 5/2024 | Sung | G06T 17/20 |

OTHER PUBLICATIONS

Lauterbach, et al., Ray-Strips: A Compact Mesh Representation for Interactive Ray Tracing, IEEE Symposium on interactive Ray Tracing, Sep. 10, 2007, pp. 19-26 (Year: 2009).*
International Search Report and Written Opinion received for PCT Application No. PCT/US2024/055302 (MS# 413894-PCT01), Feb. 13, 2025, 15 pages.

(Continued)

*Primary Examiner* — Michael Le
(74) *Attorney, Agent, or Firm* — Workman Nydegger

(57) ABSTRACT

A system is configurable to access a precomputed topology associated with a mesh that comprises a plurality of object components. The precomputed topology defines a plurality of object component groups that each comprise a respective set of object components of the mesh. The system is configurable to determine a traversal likelihood metric associated with the mesh that indicates a likelihood that rays of a ray trace operation will traverse acceleration structure nodes representing object components of the mesh, and use the plurality of object component groups as inputs to construct an acceleration structure. When the traversal likelihood metric satisfies a threshold, leaf nodes of at least one intermediate node of the acceleration structure each comprise a respective object component of an object component group. When the traversal likelihood metric fails to satisfy the threshold, at least one leaf node of the acceleration structure comprises an object component group.

16 Claims, 10 Drawing Sheets

(56) References Cited

OTHER PUBLICATIONS

Kirill Garanzha, "The Use of Precomputed Triangle Clusters for Accelerated Ray Tracing in Dynamic Scenes", Computer Graphics Forum, vol. 28, Issue 4, Aug. 17, 2009, pp. 1199-1206.

Lauterbach, et al., "Ray-Strips: A Compact Mesh Representation for Interactive Ray Tracing", IEEE Symposium on Interactive Ray Tracing, Sep. 10, 2007, pp. 19-26.

Matt, et al., "Bounding Volume Hierarchies—Physically Based Rendering: From Theory to Implementation, chapter 4.3", Retrieved from internet URL: https://pbr-book.org/3ed-2018/Primitives_and_Intersection_Acceleration/Bounding_Volume_Hierarchies, Sep. 30, 2016, pp. 1-20.

Wang, et al., "A fast ray tracing algorithm based on a hybrid structure", Multimedia Tools and Applications, vol. 75, Nov. 18, 2014, pp. 1883-1898.

* cited by examiner

800

802 — Accessing A Precomputed Topology Associated With A Mesh Of A Virtual Object For Inclusion In A Virtual Environment, Wherein The Mesh Comprises A Plurality Of Object Components, And Wherein The Precomputed Topology Defines A Plurality Of Object Component Groups That Each Comprise A Respective Set Of Object Components Of The Mesh

804 — Determining A Traversal Likelihood Metric Associated With The Mesh, Wherein The Traversal Likelihood Metric Indicates A Likelihood That One Or More Rays Of A Ray Trace Operation Will Traverse One Or More Acceleration Structure Nodes Representing One Or More Object Components Of The Mesh

806 — Using The Plurality Of Object Component Groups As Inputs To Construct An Acceleration Structure, Wherein: (i) When The Traversal Likelihood Metric Satisfies A Threshold, One Or More Leaf Nodes Of At Least One Intermediate Node Of The Acceleration Structure Comprise A Respective Object Component Of An Object Component Group Of The Plurality Of Object Component Groups, And (ii) When The Traversal Likelihood Metric Fails To Satisfy The Threshold, At Least One Leaf Node Of The Acceleration Structure Comprises An Object Component Group Of The Plurality Of Object Component Groups

808 — Performing The Ray Trace Operation By Testing A Plurality Of Rays Against Nodes Of The Acceleration Structure To Determine Whether Any Of The Plurality Of Rays Intersect With Any Of The Plurality Of Object Components Of The Mesh

810 — In Response To Determining That One Or More Rays Intersect With One Or More Object Components Of The Mesh, Identifying Vertex Attributes Associated With The One Or More Object Components Using The Precomputed Topology Associated With The Mesh

902
Accessing A Precomputed Topology Associated With A Mesh Of A Virtual Object For Inclusion In A Virtual Environment, Wherein The Mesh Comprises A Plurality Of Object Components, And Wherein The Precomputed Topology Defines A Plurality Of Object Component Groups That Each Comprise A Respective Set Of Object Components Of The Mesh 904
Using The Plurality Of Object Component Groups As Inputs To Construct An Acceleration Structure, Wherein One Or More Leaf Nodes Of At Least One Intermediate Node Of The Acceleration Structure Comprise A Respective Object Component Of An Object Component Group Of The Plurality Of Object Component Groups 906
Performing A Ray Trace Operation By Testing A Plurality Of Rays Against Nodes Of The Acceleration Structure To Determine Whether Any Of The Plurality Of Rays Intersect With Any Of The Plurality Of Object Components Of The Mesh 908
In Response To Determining That One Or More Rays Intersect With One Or More Object Components Of The Mesh, Identifying Vertex Attributes Associated With The One Or More Object Components Using The Precomputed Topology Associated With The Mesh

1002
Accessing A Precomputed Topology Associated With A Mesh Of A Virtual Object For Inclusion In A Virtual Environment, Wherein The Mesh Comprises A Plurality Of Object Components, And Wherein The Precomputed Topology Defines A Plurality Of Object Component Groups That Each Comprise A Respective Set Of Object Components Of The Mesh 1004
Using The Plurality Of Object Component Groups As Inputs To Construct An Acceleration Structure, Wherein At Least One Leaf Node Of The Acceleration Structure Comprises An Object Component Group Of The Plurality Of Object Component Groups 1006
Performing A Ray Trace Operation By Testing A Plurality Of Rays Against Nodes Of The Acceleration Structure To Determine Whether Any Of The Plurality Of Rays Intersect With Any Of The Plurality Of Object Components Of The Mesh 1008
In Response To Determining That One Or More Rays Intersect With One Or More Object Components Of The Mesh, Identifying Vertex Attributes Associated With The One Or More Object Components Using The Precomputed Topology Associated With The Mesh

*FIG. 10*

PRECOMPUTED TOPOLOGY FOR REALTIME RAY TRACING

BACKGROUND

Ray tracing is a technique for generating visible imagery reconstructed in a 3D computer graphics environment. In some instances, ray tracing involves tracing one or more rays from a viewing position or scene point toward other parts of the virtual environment. Ray tracing can be used to simulate a variety of optical effects, such as reflection, refraction, shadows, scattering, ambient occlusion, global illumination, and/or others. For example, rays traced from a virtual object toward a light source in a virtual environment can intersect with other objects in the virtual environment, and the intersections can be used to determine shadowing characteristics for representing the virtual object on a display (e.g., pursuant to a user experience, such as gaming).

Ray tracing is generally associated with high computational cost and has typically been used in implementations where long rendering times are feasible, such as for generating still computer-generated images or cinematic visual effects. In real-time applications, such as computer graphics for video games or other implementations where rendering speed affects user experience, utilizing ray tracing is associated with many challenges.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 8, 9, and 10 illustrate example flow diagrams depicting acts associated with building acceleration structures using precomputed topologies.

DETAILED DESCRIPTION

Figure 1:
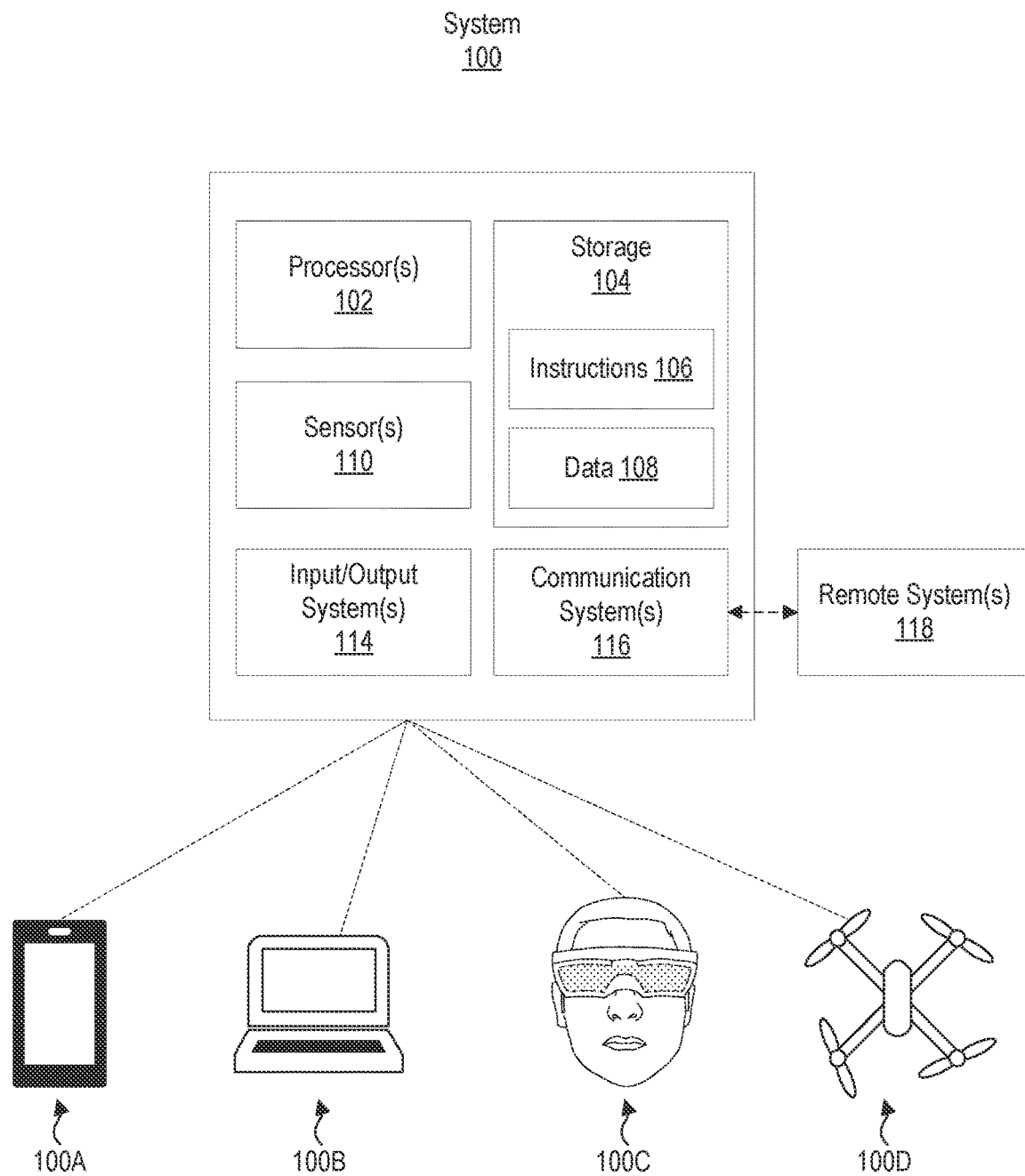
FIG. 1 illustrates example components of an example system that may include or be used to implement one or more disclosed embodiments.

Disclosed embodiments are generally directed to systems, methods, and apparatuses for utilizing precomputed topologies of object meshes to facilitate building of acceleration structures and/or performance of raytracing.

As noted above, implementing ray tracing in real-time computer graphics applications is associated with many challenges, in particular because of the computational burden associated with conventional ray tracing techniques. Attempts to adapt ray tracing techniques for real-time applications include utilizing an acceleration structure, which partitions the object components (e.g., mesh triangles, quads, curved surfaces, distance fields, high-level representations, and/or others) of virtual object meshes of a virtual environment into a structure of nodes. For instance, nodes of conventional acceleration structures may include either a number of child nodes (e.g., 2, 4, 8, 16, or any number of child nodes) or an object component of a virtual object mesh in the virtual environment (e.g., for leaf nodes, which have no child nodes). Conventional acceleration structures are typically built for virtual environments frame-by-frame (e.g., to capture changes and/or movement of virtual content in a virtual environment) by using the individual object components (e.g., triangles) of the meshes in the environment as inputs to an acceleration structure construction module, which can utilize various techniques (e.g., top-down construction, bottom-up construction, octree division, kd-tree partitioning, grid subdivision, binary space partitioning, and/or others).

Implementing an acceleration structure can allow systems, during ray tracing, to refrain from testing each ray against every object component within a virtual environment to determine the intersected object component for each ray. Instead, a system may, for each ray, traverse the acceleration structure for each ray by determining which top-level (or starting level) node the ray intersects with, determining which child node of the intersected top-level node the ray intersects with, and so forth (e.g., continuing to test/traverse branches of nodes) until a leaf node (e.g., a node with no child nodes) is reached. The system may then test the ray against the object component (e.g., triangle) contained by the leaf node and obtain vertex attributes for the object component. The vertex attributes can be used to determine display characteristics for representing the virtual environment (e.g., to determine lighting/shadowing characteristics).

Although conventional acceleration structure techniques can facilitate some reduction in the computational cost associated with ray tracing, further improvements can be made to techniques for constructing acceleration structures for use in ray tracing. For instance, conventional frame-by-frame acceleration structure building techniques use all object components of all virtual objects in a virtual environment/scene as inputs, and each object component is represented in a leaf node of the acceleration structure. However, in many cases, at least some virtual objects in a virtual environment are unlikely to be intersected by a large quantity of rays during ray tracing. For example, a particular virtual object may be occluded, may be out of the view frustrum, or may be positioned at a far distance from the ray trace origin point, resulting in a low likelihood that numerous (or any) rays will intersect with the particular virtual object. Notwithstanding, conventional acceleration structure building techniques would represent all object components of occluded, out-of-sight, or distant objects in leaf nodes of the acceleration structure, resulting in unnecessary structure complexity and computational cost associated with building the acceleration structure for the frame.

At least some disclosed embodiments are directed to utilizing groupings of object components as inputs for building an acceleration structure. For instance, prior to utilizing a virtual object mesh in a virtual environment, and as a precomputation step, a system can determine a topology of object component groupings for the virtual object mesh. For example, in the case of mesh triangles, each object component group can comprise a triangle fan or a triangle strip, which can be defined using a greedy algorithm or other topology determination technique. When generating a per-frame acceleration structure for a virtual environment that includes the virtual object mesh at runtime, the triangle fans or triangle strips of the virtual object (defined according to the precomputed topology) can be used as inputs for generating the acceleration structure (in conjunction with triangle fans or triangle strips for other virtual objects in the virtual environment). Hardware that supports ray tracing is typically configurable to store multiple contiguous triangles such as triangle fans or triangle, however such functionality is not typically utilized because of the infeasibility of dividing meshes into triangle fans or triangle strips at runtime.

The triangle fans or triangle strips (or other object component group types) of a virtual object mesh can be represented in the resulting per-frame acceleration structure in various ways. In some instances, a triangle fan or triangle strip is represented in the acceleration structure as an intermediate node, with leaf nodes branching from the intermediate node storing individual triangles of the triangle fan or the triangle strip. Such a configuration can contribute to increased computational cost of building the acceleration structure, but can be more efficient to test rays against during raytracing to build a display frame. Alternatively, a triangle fan or triangle strip can be represented in the acceleration structure as a leaf node, such that the leaf node includes all triangles associated with the triangle fan or the triangle strip. Such a configuration can contribute to reduced computational cost of building the acceleration structure and can enable storage of the acceleration structure with less random-access memory (RAM), which can be beneficial for raytracing operations. However, an acceleration structure that stores triangle fans or triangle strips as leaf nodes can be less efficient to test rays against during raytracing to build a display frame.

In some implementations, given a precomputed topology of object component groups for a virtual object mesh, a system can intelligently determine at runtime how to represent object component groups of a virtual object mesh in an acceleration structure based on attributes of the virtual object mesh. For instance, a system may determine a traversal likelihood metric associated with the virtual object mesh, and, based on the traversal likelihood metric, determine whether to represent the object component groups as leaf nodes or as intermediate nodes.

By way of example, a traversal likelihood metric for a virtual object mesh can comprise a distance between the virtual object mesh and a ray origin point (e.g., a virtual camera position) for ray tracing within the virtual environment. The greater the distance, the less likely it is that a large quantity of rays will intersect with object components of the virtual object mesh. In cases where few (if any) rays are expected to intersect with object components of the virtual object mesh, representing the object component groups as leaf nodes in the acceleration structure can facilitate a decrease in the computational cost of building the acceleration structure that outweighs the decreased efficiency of testing rays against the leaf nodes that contain entire object component groups. Accordingly, when the traversal likelihood metric indicates a large distance between the virtual object mesh and the ray trace origin point, the system can elect to represent the object component groups of the virtual object mesh as leaf nodes within the acceleration structure.

Conversely, in cases where a large quantity of rays are expected to intersect with object components of the virtual object mesh, representing the object component groups of the virtual object mesh as intermediate nodes in the acceleration structure can facilitate an increase in the efficiency ray testing that outweighs the increase in the computational cost of building the acceleration structure. Accordingly, when the traversal likelihood metric indicates a small distance between the virtual object mesh and the ray trace origin point, the system can elect to represent the object component groups of the virtual object mesh as intermediate nodes within the acceleration structure.

As another example, a traversal likelihood metric can comprise temporal data indicating a historical quantity of rays determined to intersect with the virtual object mesh. For instance, if no rays or only a small quantity of rays intersected with the virtual object mesh in a temporally preceding frame/iteration, it is less likely that a large quantity of rays will intersect with the virtual object mesh in the current frame. In such cases, the system can elect to represent object component groups of the virtual object mesh as leaf nodes within the acceleration structure for the current frame.

Conversely, if a large quantity of rays intersected with the virtual object mesh in a temporally preceding frame/iteration, it is likely that a large quantity of rays will intersect with the virtual object mesh in the current frame. In such cases, the system can elect to represent object component groups of the virtual object mesh as intermediate nodes within the acceleration structure for the current frame.

In some instances, the amount or nature of camera or ray origin point motion is used as an input for determining a traversal likelihood metric. For instance, a large amount of camera motion can reduce the confidence placed on previous ray intersection data for a virtual object mesh to predict the likelihood of ray intersections with the virtual object mesh for the current frame, which can weigh the system toward electing to represent object component groups of the virtual object mesh as intermediate nodes within the acceleration structure for the current frame. Furthermore, in some instances, the amount or nature of virtual object movement is used as an input for determining a traversal likelihood metric. For instance, a large amount of virtual object motion can reduce the confidence placed on previous ray intersection data for a virtual object mesh to predict the likelihood of ray intersections with the virtual object mesh for the current frame, which can weigh the system toward electing to represent object component groups of the virtual object mesh as intermediate nodes within the acceleration structure for the current frame.

The acceleration structure can represent object components using indices associated with the precomputed topology of object component groups discussed above (e.g., group 1 triangle 2, group 3 triangle 7, etc.). After determining that a ray intersects with an object component via the acceleration structure, the precomputed topology can be used to map the intersected object component (in the indices of the precomputed topology) to vertices of the virtual object mesh (e.g., in the indices of the virtual object mesh), enabling acquisition of vertex attributes for building a display frame based on the intersected object component.

By implementing the techniques described above and hereinafter, systems can facilitate intelligent acceleration structure building that achieves a desirable tradeoff between computational cost of building the acceleration structure, RAM savings/usage, and computational efficiency in testing rays against the acceleration structure.

Example Systems and Components

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. A system 100 may take on other forms in accordance with the present disclosure.

Precomputed Topology for Realtime Ray Tracing

Figure 2:
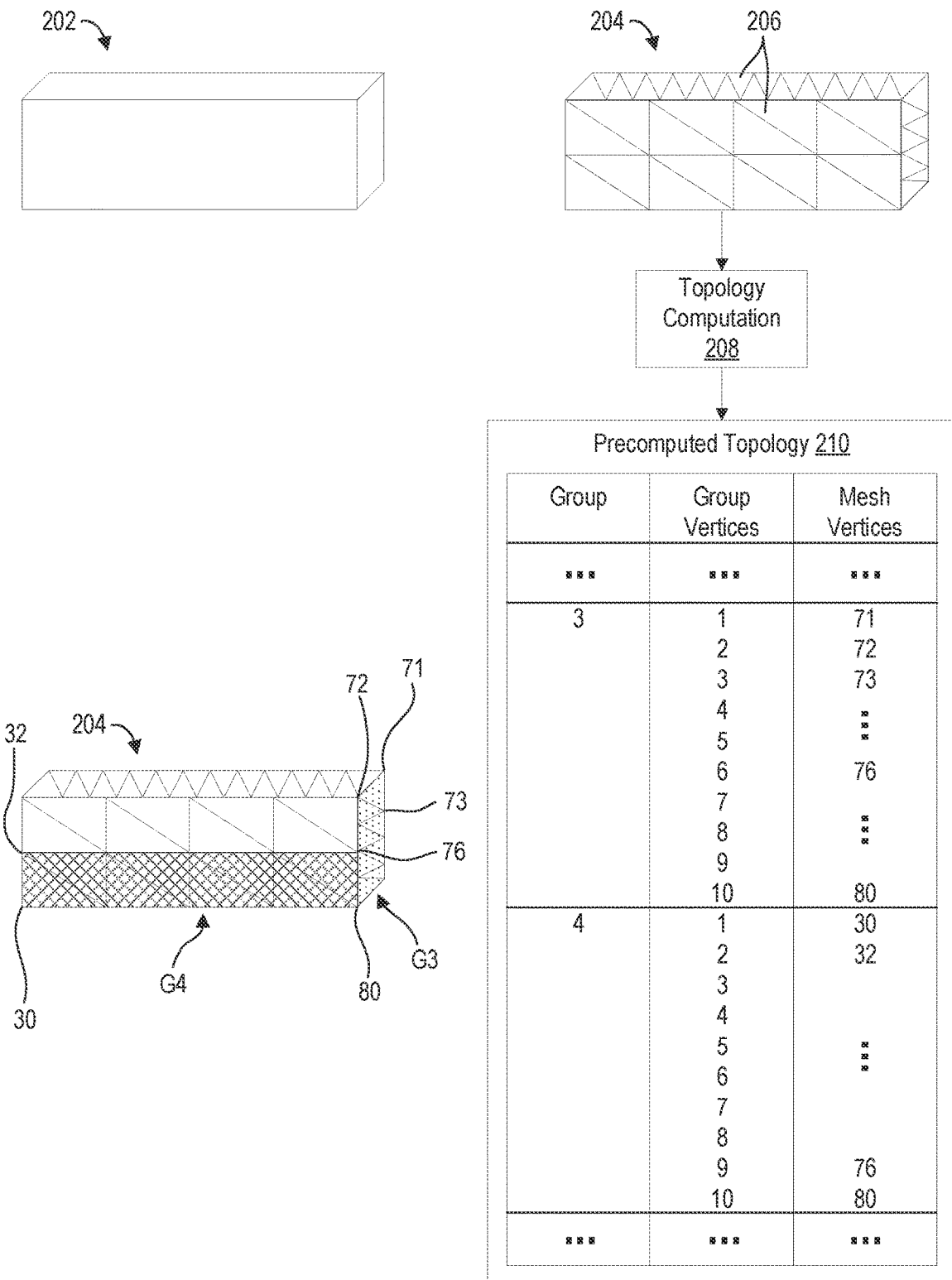
FIG. 2 illustrates a conceptual representation of generating a precomputed topology of object components of a mesh of a virtual object that can be included in virtual environments.

FIG. 2 illustrates a conceptual representation of generating a precomputed topology of object components of a mesh of a virtual object. FIG. 2 illustrates a virtual object 202, embodied as a virtual box. The virtual object 202 can be included in virtual environments associated with user experiences, such as gaming or other at least partially immersive experiences. The virtual object 202 can be represented by respective object components, which may take on various forms (e.g., triangles, quads, curved surfaces, distance fields, high-level representations, and/or others). FIG. 2 illustrates a mesh 204 that includes object components of the virtual object 202 implemented as triangles 206.

FIG. 2 conceptually depicts performing topology computation 208 on the object triangles 206 of the mesh 204 of the virtual object 202. In the example of FIG. 2, the topology computation 208 is performed as a precomputation step, prior to the virtual object 202 being represented in a virtual environment. The topology computation 208 results in a precomputed topology 210 of the mesh 204 that defines groups of the object components (e.g., triangles 206) of the mesh 204. The groups of object components can take on various forms. For instance, in the case of triangles 206, the groups of object components represented in the precomputed topology 210 can include triangle strips or triangle fans.

The topology computation 208 can include various techniques/processes, such as a greedy algorithm, a brute force algorithm, a topological sorting algorithm, and/or others. In some implementations, the topology computation 208 defines groups of the triangles 206 of the mesh 204 in accordance with a maximum size parameter, which can constrain the quantity of vertices or object components in each group. The maximum size parameter can be selected based on a maximum boundary volume size for association with bottom-level acceleration structure nodes. The maximum size parameter can mitigate ray testing inefficiency at runtime that could result from excessive object component group size.

As noted above, the precomputed topology 210 generated via topology computation 208 on the triangles 206 of the mesh 204 defines object component groups (or triangle groups) that each include a respective set of triangles 206 of the mesh 204. FIG. 2 conceptually depicts the precomputed topology 210 as a data structure that includes a "Group" dimension, a "Group Vertices" dimension, and a "Mesh Vertices" dimension. In the example of FIG. 2, the "Group" dimension provides a group index or group identifier/number for the different groups of object components of the precomputed topology 210. The "Group Vertices" dimension provides, within each group of the precomputed topology 210, a vertex index or vertex identifier/number for the vertices that form the object components that are represented in the group. The "Mesh Vertices" dimension provides, within each group of the precomputed topology 210, a mapping of each vertex of the group (according to the "Group Vertices" index) to a vertex index or vertex identifier/number as defined by the mesh 204. The indices or identifiers/numbers for vertices as defined by the mesh 204 can be associated with vertex attributes (e.g., texture UVs, normals, and/or others). By mapping the indices or identifiers/numbers for vertices of the individual groups of the precomputed topology 210 to the indices or identifiers/numbers for vertices of the mesh 204 as a whole, rapid acquisition of vertex attributes for intersected object components can be facilitated at runtime, as will be described in more detail hereinafter.

To provide an illustrative, non-limiting example, FIG. 2 depicts a part of the data represented by the precomputed topology 210. In particular, FIG. 2 illustrates an object component group associated with the identifier "3" (according to the "Group" dimension) that includes vertices 1, 2, 3, 4, 5, 6, 7, 8, 9, and 10 (according to the "Group Vertices" dimension). For ease of description, this group will be referred to as "group 3". The vertices of group 3 form the object components represented in group 3. For instance, vertices 1, 2, and 3 form a first triangle, vertices 2, 3, 4 form a second triangle, and so on. The vertices of group 3 are mapped to vertex indices of the mesh 204 (according to the "Mesh Vertices" dimension). For example, vertex 1 of group 3 is mapped to vertex 71 of the mesh 204, vertex 2 of group 3 is mapped to vertex 72 of the mesh 204, vertex 3 of group 3 is mapped to vertex 73 of the mesh 204, vertex 6 of group 3 is mapped to vertex 76 of the mesh 204, and vertex 10 of group 3 is mapped to vertex 80 of the mesh 204.

FIG. 2 also depicts another object component group associated with the identifier "4" that includes its own set of vertices 1, 2, 3, 4, 5, 6, 7, 8, 9, and 10. For ease of description, this group will be referred to as "group 4". The vertices of group 4 form the object components represented in group 4 and are mapped to vertex indices of the mesh 204. For example, vertex 1 of group 4 is mapped to vertex 30 of the mesh 204, vertex 2 of group 4 is mapped to vertex 32 of the mesh 204, vertex 9 of group 4 is mapped to vertex 76 of the mesh 204, vertex 10 of group 4 is mapped to vertex 80 of the mesh 204.

FIG. 2 provides a visual representation of group 3 (labeled "G3") of the precomputed topology 210 on the depiction of the mesh 204 on the left side of the precomputed topology 210. FIG. 2 illustrates group 3 as forming a triangle strip (marked with a dot pattern) along the right side of the mesh 204, which includes vertices 71, 72, 73, 76, 80, and other vertices of the mesh 204 (corresponding to vertices 1, 2, 3, 6, 10, and other vertices of group 3 according to the "Group Vertices" dimension). FIG. 2 also provides a visual representation of group 4 (labeled "G4") of the precomputed topology 210. FIG. 2 illustrates group 4 as forming a triangle strip (marked with a crosshatch pattern) on the front of the mesh 204, which includes vertices 30, 32, 76, 80, and other vertices of the mesh 204 (corresponding to vertices 1, 2, 9, 10, and other vertices of group 4 according to the "Group Vertices" dimension). As noted above, although triangle strips are illustrated in FIG. 2, other types of object component groups may be represented in a precomputed topology 210, such as triangle fans or others.

Formats and/or dimensions/components of a precomputed topology 210 (which defines groups of object components of a mesh) other than those shown and described with reference to FIG. 2 are within the scope of the present disclosure. For example, a precomputed topology 210 can implement triangle-based indices rather than vertex-based indices as shown in FIG. 2 (e.g., rather than a "Group Vertices" dimension and a "Mesh Vertices" dimension, a precomputed topology 210 can include a "Group Triangles" dimension and a "Mesh Triangles" dimension).

Figure 3:
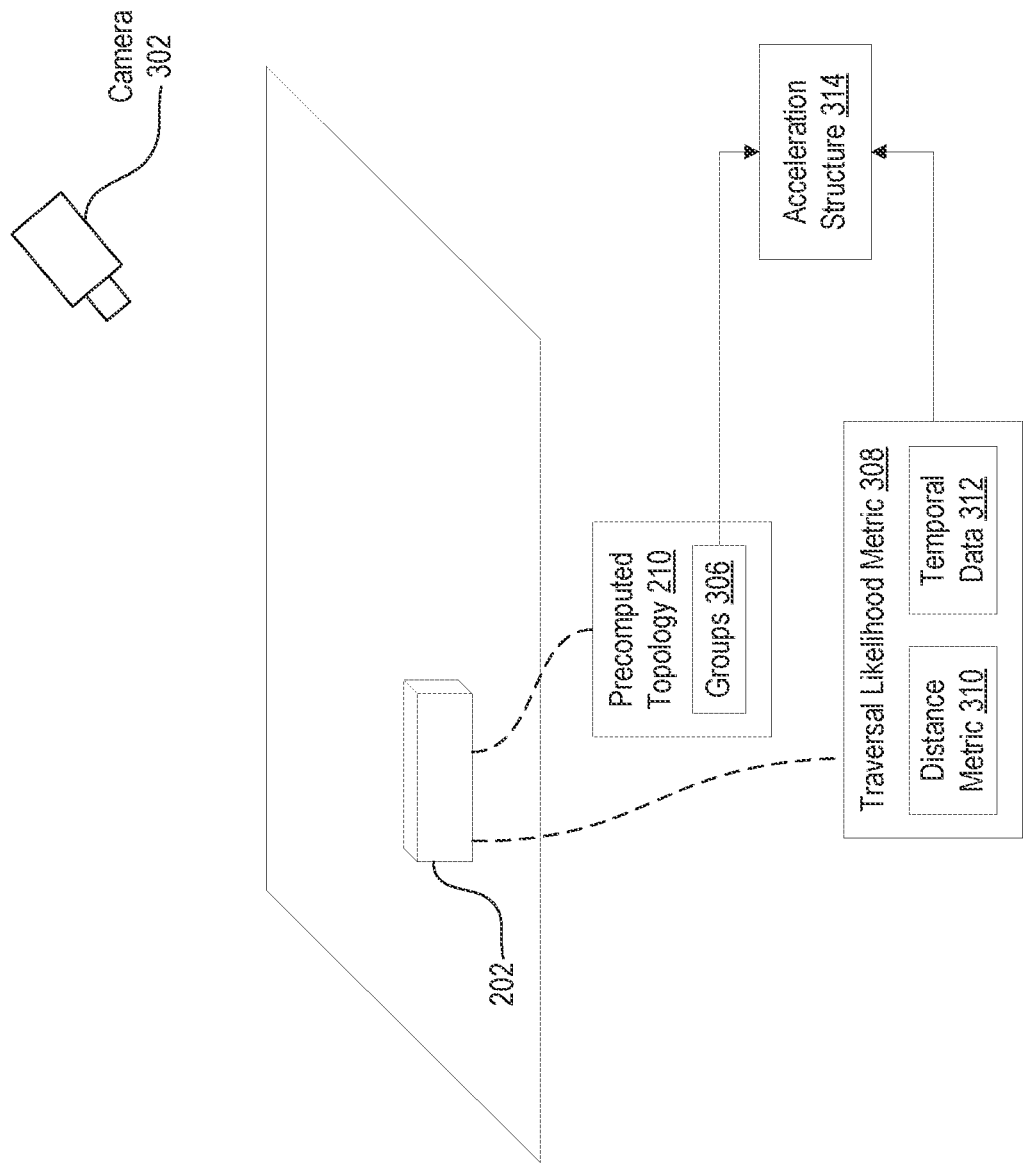
FIG. 3 illustrates a conceptual representation of the virtual object of FIG. 2 included in a virtual environment and conceptually depicts using the precomputed topology of FIG. 2 and a traversal likelihood metric associated with the virtual object to generate an acceleration structure associated with the virtual environment.

The precomputed topology 210 associated with the mesh 204 of the virtual object 202 can be implemented at runtime to facilitate various advantages in building frame-by-frame acceleration structures for performing ray tracing to determine frame-by-frame display output (e.g., in gaming or other user experiences) for depicting virtual environments of which the virtual object 202 is a part. Advantageously, although the positions of vertices of meshes in virtual environments may change frame-to-frame (e.g., due to movement of character limbs, wind animation on clothing, foliage effects), precomputed topologies as described herein may continue to accurately describe the grouping of object components of the meshes, enabling the same precomputed topologies to be used to build multiple per-frame acceleration structures over multiple frames. For instance, FIG. 3 depicts a virtual environment 300 that includes the virtual object 202 (or the mesh 204 of the virtual object 202). FIG. 3 illustrates a camera 302 (e.g., a virtual camera) within the virtual environment 300 at a current timepoint. Ray tracing may be performed from the perspective of the camera 302 to determine content for display pixels (e.g., of a user device) to display the virtual environment 300 from the perspective of the camera 302 at the current timepoint. The ray tracing may utilize an acceleration structure 314 to determine object components of the virtual environment 300 that rays intersect with, and the intersected object components may provide display information (e.g., based on vertex attributes of the intersected object components) for displaying a representation of the virtual environment 300 at the current timepoint. Although the depicted example focuses on ray tracing to determine content for display pixels, the principles disclosed herein cab be applied in conjunction with ray tracing for determining other visual characteristics for representing a virtual environment, such as reflection, refraction, shadows, scattering, ambient occlusion, global illumination, and/or others (e.g., by tracing rays from points on objects in the virtual environment, rather from a virtual camera or virtual viewing position).

FIG. 3 conceptually depicts that the acceleration structure 314 may be generated at runtime based at least in part on the precomputed topology 210 associated with the virtual object 202. Precomputed topologies associated with other virtual objects within the virtual environment (if any) may also contribute to the acceleration structure 314. FIG. 3 depicts the groups 306 of object components defined in the precomputed topology 210 (e.g., group 3, group 4, and/or other as discussed hereinabove with reference to FIG. 2) being used as inputs for generating the acceleration structure 314. As noted above, the groups 306 of the precomputed topology 210 can be represented in the acceleration structure 314 in various ways. For instance, groups 306 can be represented in leaf nodes or intermediate nodes of the acceleration structure 314.

In some implementations, whether to represent the groups 306 of the precomputed topology 210 for the virtual object 202 in the acceleration structure 314 as leaf nodes or intermediate nodes is determined based on a traversal likelihood metric 308 associated with the virtual object 202. The traversal likelihood metric 308 indicates the likelihood that rays of a ray trace operation for the current timepoint (to be performed) will traverse acceleration structure nodes representing object components associated with the virtual object 202. The traversal likelihood metric 308 can take on various forms, such as a distance metric 310 or temporal data 312, as shown in the example of FIG. 3.

In some implementations, the distance metric 310 is the distance between the virtual object 202 and a ray origin of the ray trace operation for the current timepoint (to be performed using the acceleration structure 314). In the example of FIG. 3, the distance metric 310 is the distance between the virtual object 202 and the camera 302 from which rays will be traced to determine display content for representing the virtual environment 300 at the current timepoint. When the distance between the virtual object 202 and the camera 302 is large, a small quantity of rays (if any) traced from the camera 302 is expected to intersect with the virtual object 202. Thus, in some implementations, when the distance metric 310 is above a threshold distance, a system can build the acceleration structure 314 such that the groups 306 of object components of the precomputed topology 210 are represented as leaf nodes in the acceleration structure 314.

Figure 4:
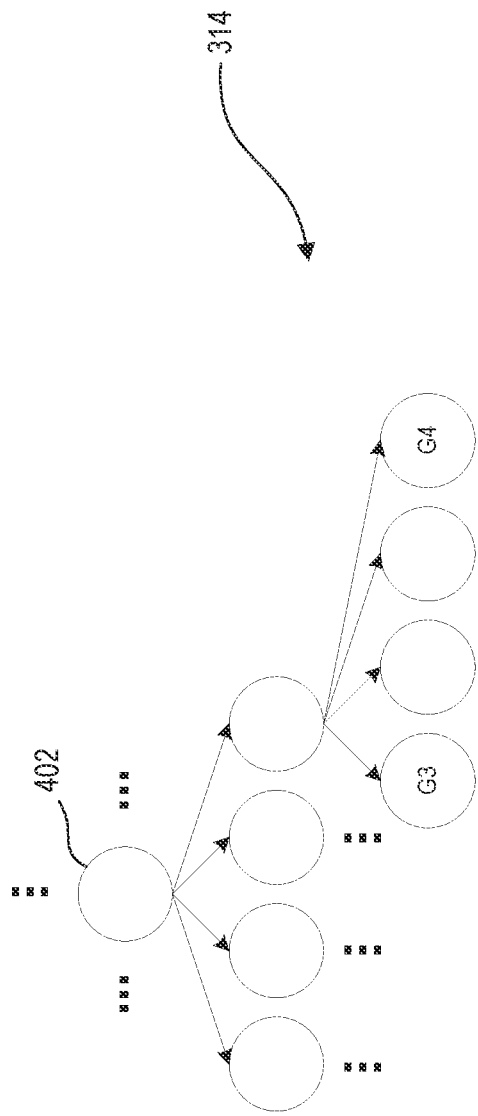
FIG. 4 illustrates a conceptual representation of part of the acceleration structure of FIG. 3 when the traversal likelihood metric fails to satisfy a threshold.

FIG. 4 illustrates an example part of the acceleration structure 314 with the groups 306 of object components defined by the precomputed topology 210 represented in the acceleration structure 314 as leaf nodes. FIG. 4 illustrates an intermediate node 402 of the acceleration structure 314 with child nodes that encompass the object components associated with the virtual object 202 (higher-level and other same-level nodes are abstracted with ellipses). FIG. 4 also illustrates leaf nodes branching from the intermediate node 402 that include different groups 306 of object components of the mesh 204 of the virtual object 202. For instance, FIG. 4 illustrates a leaf node labeled "G3" that includes the group 3 vertices of the precomputed topology 210 described hereinabove with reference to FIG. 2. FIG. 4 also illustrates a leaf node labeled "G4" that includes the group 4 vertices of the precomputed topology 210 described hereinabove with reference to FIG. 2.

Figure 5:
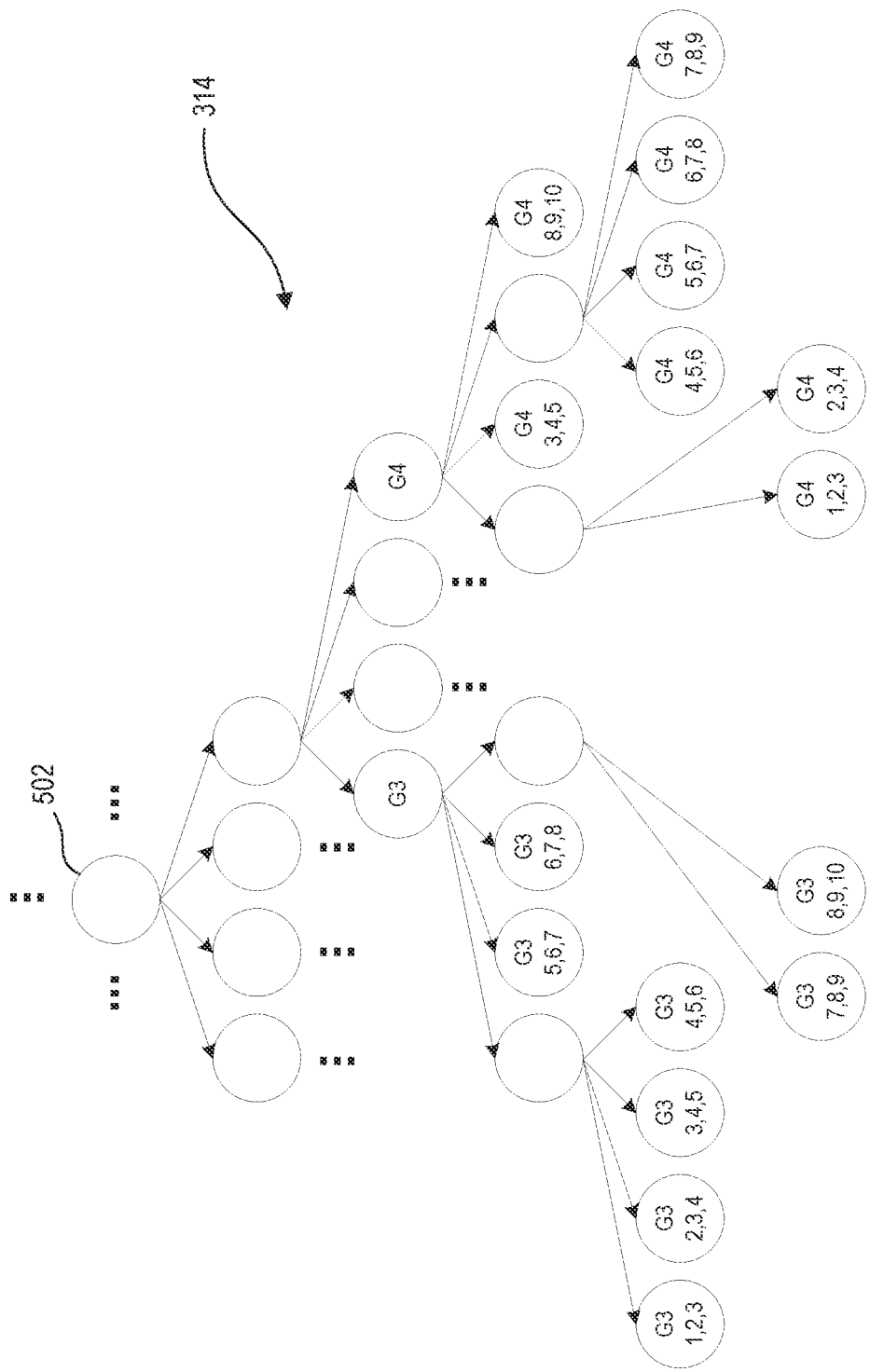
FIG. 5 illustrates a conceptual representation of part of the acceleration structure of FIG. 3 when the traversal likelihood metric satisfies a threshold.

Representing the groups 306 of object components defined by the precomputed topology 210 as leaf nodes of the acceleration structure 314 (e.g., as shown in FIG. 4) can reduce the size and/or complexity of the acceleration structure 314 and can therefore reduce the computational burden associated with building the acceleration structure 314 (e.g., compared to the acceleration structure shown in FIG. 5). However, representing the groups 306 of object components defined by the precomputed topology 210 as leaf nodes of the acceleration structure 314 can increase computational cost associated with testing rays against the acceleration structure 314. In one example, upon encountering the G3 leaf node of FIG. 4 during ray testing, the ray would be tested against every triangle contained within the G3 leaf node to determine an intersection, which can reduce computational efficiency and/or the speed with which an intersected object component is determined. Thus, when the quantity of rays expected to traverse the part of the acceleration structure 314 shown in FIG. 4 is small (e.g., when the distance metric 310 is above a threshold), the benefit of reducing the size and/or complexity of the acceleration structure 314 by representing the groups 306 of object components defined by the precomputed topology 210 as leaf nodes can outweigh the cost of reduced ray testing efficiency.

When the distance between the virtual object 202 and the camera 302 is small, a large quantity of rays traced from the camera 302 is expected to intersect with the virtual object 202. Thus, in some implementations, when the distance metric 310 is below a threshold distance, a system can build the acceleration structure 314 such that the groups 306 of object components of the precomputed topology 210 are represented as intermediate nodes in the acceleration structure.

FIG. 5 illustrates an example part of the acceleration structure 314 with the groups 306 of object components defined by the precomputed topology 210 represented in the acceleration structure 314 as intermediate nodes. FIG. 5 illustrates a higher-level intermediate node 502 of the acceleration structure 314 with child nodes that encompass the object components associated with the virtual object 202 (higher-level and other same-level nodes are abstracted with ellipses). FIG. 5 also illustrates intermediate nodes branching from the higher-level intermediate node 502 that include different groups of object components of the mesh 204 of the virtual object 202. For instance, FIG. 5 illustrates an intermediate node labeled "G3" that contains leaf nodes that encompass the group 3 vertices of the precomputed topology 210 described hereinabove with reference to FIG. 2. Specifically, FIG. 5 illustrates a leaf node labeled "G3 1, 2, 3" (indicating that the leaf node contains vertices 1, 2, and 3 of group 3 of the precomputed topology 210), a leaf node labeled "G3 2, 3, 4" (indicating that the leaf node contains vertices 2, 3, and 4 of group 3 of the precomputed topology 210), a leaf node labeled "G3 3, 4, 5" (indicating that the leaf node contains vertices 3, 4, and 5 of group 3 of the precomputed topology 210), a leaf node labeled "G3 4, 5, 6" (indicating that the leaf node contains vertices 4, 5, and 6 of group 3 of the precomputed topology 210), a leaf node labeled "G3 5, 6, 7" (indicating that the leaf node contains vertices 5, 6, and 7 of group 3 of the precomputed topology 210), a leaf node labeled "G3 6, 7, 8" (indicating that the leaf node contains vertices 6, 7, and 8 of group 3 of the precomputed topology 210), a leaf node labeled "G3 7, 8, 9" (indicating that the leaf node contains vertices 7, 8, and 9 of group 3 of the precomputed topology 210), and a leaf node labeled "G3 8, 9, 10" (indicating that the leaf node contains vertices 8, 9, and 10 of group 3 of the precomputed topology 210) that are all downstream of the G3 intermediate node.

FIG. 5 also illustrates an intermediate node labeled "G4" that contains leaf nodes that encompass the group 4 vertices of the precomputed topology 210 described hereinabove with reference to FIG. 2. Specifically, FIG. 5 illustrates a leaf node labeled "G4 1, 2, 3" (indicating that the leaf node contains vertices 1, 2, and 3 of group 4 of the precomputed topology 210), a leaf node labeled "G4 2, 3, 4" (indicating that the leaf node contains vertices 2, 3, and 4 of group 4 of the precomputed topology 210), a leaf node labeled "G4 3, 4, 5" (indicating that the leaf node contains vertices 3, 4, and 5 of group 4 of the precomputed topology 210), a leaf node labeled "G4 4, 5, 6" (indicating that the leaf node contains vertices 4, 5, and 6 of group 4 of the precomputed topology 210), a leaf node labeled "G4 5, 6, 7" (indicating that the leaf node contains vertices 5, 6, and 7 of group 4 of the precomputed topology 210), a leaf node labeled "G4 6, 7, 8" (indicating that the leaf node contains vertices 6, 7, and 8 of group 4 of the precomputed topology 210), a leaf node labeled "G4 7, 8, 9" (indicating that the leaf node contains vertices 7, 8, and 9 of group 4 of the precomputed topology 210), and a leaf node labeled "G4 8, 9, 10" (indicating that the leaf node contains vertices 8, 9, and 10 of group 4 of the precomputed topology 210) that are all downstream of the G4 intermediate node.

Representing the groups 306 of object components defined by the precomputed topology 210 as intermediate nodes of the acceleration structure 314 (e.g., as shown in FIG. 5) can increase the size and/or complexity of the acceleration structure 314 and can therefore increase the computational burden associated with building the acceleration structure 314 (e.g., compared to the acceleration structure shown in FIG. 4). However, representing the groups 306 of object components defined by the precomputed topology 210 as intermediate nodes of the acceleration structure 314 can reduce the computational cost associated with testing rays against the acceleration structure 314. Thus, when the quantity of rays expected to traverse the part of the acceleration structure shown in FIG. 5 is large (e.g., when the distance metric is below a threshold), the benefit of reducing the computational cost associated with testing rays against the acceleration structure can outweigh the increased computational burden associated with building the acceleration structure 314.

The temporal data 312 of the traversal likelihood metric 308 of FIG. 3 can provide an additional or alternative basis for determining whether to represent the groups 306 of the precomputed topology 210 in the acceleration structure 314 as leaf nodes or intermediate nodes. The temporal data 312 can indicate a quantity of rays determined to intersect with the virtual object 202 in a temporally preceding frame or ray trace iteration (e.g., prior to the current timepoint shown in FIG. 3). In the example of FIG. 3, the temporal data 312 indicates the quantity of rays traced from the camera 302 that intersected with the virtual object 202 in a preceding ray trace operation. When zero or few rays traced from the camera 302 were determined to intersect with the virtual object 202 in the prior ray trace operation, a small quantity of rays (if any) traced from the camera 302 in the current timepoint is expected to intersect with the virtual object 202. Thus, in some implementations, when the temporal data 312 is below a threshold, a system can build the acceleration structure 314 such that the groups 306 of object components of the precomputed topology 210 are represented as leaf nodes in the acceleration structure 314 (as shown and described with reference to FIG. 4).

In contrast, when many rays traced from the camera 302 were determined to intersect with the virtual object 202 in the prior ray trace operation, a large quantity of rays traced from the camera 302 in the current timepoint is expected to intersect with the virtual object 202. Thus, in some implementations, when the temporal data 312 is above a threshold, a system can build the acceleration structure 314 such that the groups 306 of object components of the precomputed topology 210 are represented as intermediate nodes in the acceleration structure 314 (as shown and described with reference to FIG. 5).

In some instances, the amount or nature of motion of the camera 302 is part of the temporal data 312. For instance, a large amount of motion of the camera 302 can reduce the confidence placed on previous ray intersection data for the virtual object 202 to predict the likelihood of ray intersections with the virtual object 202 for the current timepoint, which can weigh the system toward electing to represent object component groups 306 as intermediate nodes within the acceleration structure 314 for the current timepoint. Furthermore, in some instances, the amount or nature of motion of the virtual object 202 is part of the temporal data 312. For instance, a large amount of motion of the virtual object 202 can reduce the confidence placed on previous ray intersection data for the virtual object 202 to predict the likelihood of ray intersections with the virtual object 202 for the current timepoint, which can weigh the system toward electing to represent object component groups 306 as intermediate nodes within the acceleration structure 314 for the current timepoint.

Whether the groups 306 of the precomputed topology 210 are represented as leaf nodes or intermediate nodes in the acceleration structure 314, the use of triangle strips or triangle fans can reduce the memory bandwidth cache pressure associated with ray testing because the contiguous triangles of a triangle strip or triangle fan share vertices. As noted above, an acceleration structure can represent/encompass multiple virtual objects of a virtual environment. Each virtual object can be associated with its own respective precomputed topology and traversal likelihood metric(s). For each particular virtual object in the virtual environment, the respective traversal likelihood metric(s) can indicate whether the object component groups of the particular virtual object (defined by the respective precomputed topology) are represented in the acceleration structure as intermediate nodes or as leaf nodes. In this regard, an acceleration structure can represent object component groups of different virtual objects in different ways (e.g., some as intermediate nodes, some as leaf nodes).

Furthermore, in some implementations, traversal likelihood metrics are determined on a per-group basis. For instance, each particular object component group of a specific virtual object (defined by the precomputed topology for the specific virtual object) can have its own respective traversal likelihood metric, such as a distance from the particular object component group to a ray origin point, or temporal data associated with the particular object component group. The respective traversal likelihood metric for the particular object component group can indicate whether the particular object component group becomes represented in an acceleration structure as an intermediate node or as a leaf node. In this regard, an acceleration structure can represent different object component groups associated with a single virtual object in different ways (e.g., some as intermediate nodes, some as leaf nodes).

Figure 6:
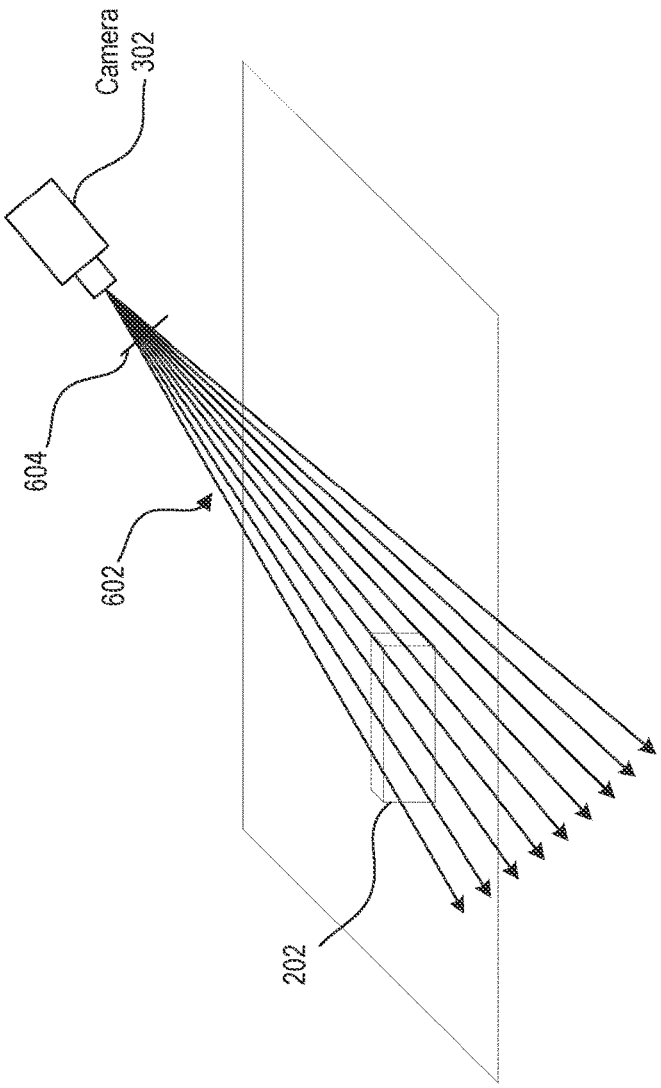
FIG. 6 illustrates a conceptual representation of performing a ray trace operation using the acceleration structure of FIG. 5.

FIG. 6 illustrates a conceptual representation of performing a ray trace operation at the current timepoint using the acceleration structure 314. The ray trace operation of FIG. 6 includes tracing rays 602 from an origin point (e.g., the camera 302) through pixels of an image plane 604 into the virtual environment 300. The pixels of the image plane 604 can correspond to display pixels that will be presented to a user to depict the virtual environment 300 to the user at the current timepoint. The rays 602 can thus be used to determine (based on intersections) what portions of the virtual environment 300 to display on corresponding display pixels for the current timepoint, as well as display attributes for depicting the intersected portions of the virtual environment 300. Although the depicted example focuses on ray tracing to determine content for display pixels, the principles disclosed herein cab be applied in conjunction with ray tracing for determining other visual characteristics for representing a virtual environment, such as reflection, refraction, shadows, scattering, ambient occlusion, global illumination, and/or others (e.g., by tracing rays from points on objects in the virtual environment, rather from a virtual camera or virtual viewing position).

Figure 7:
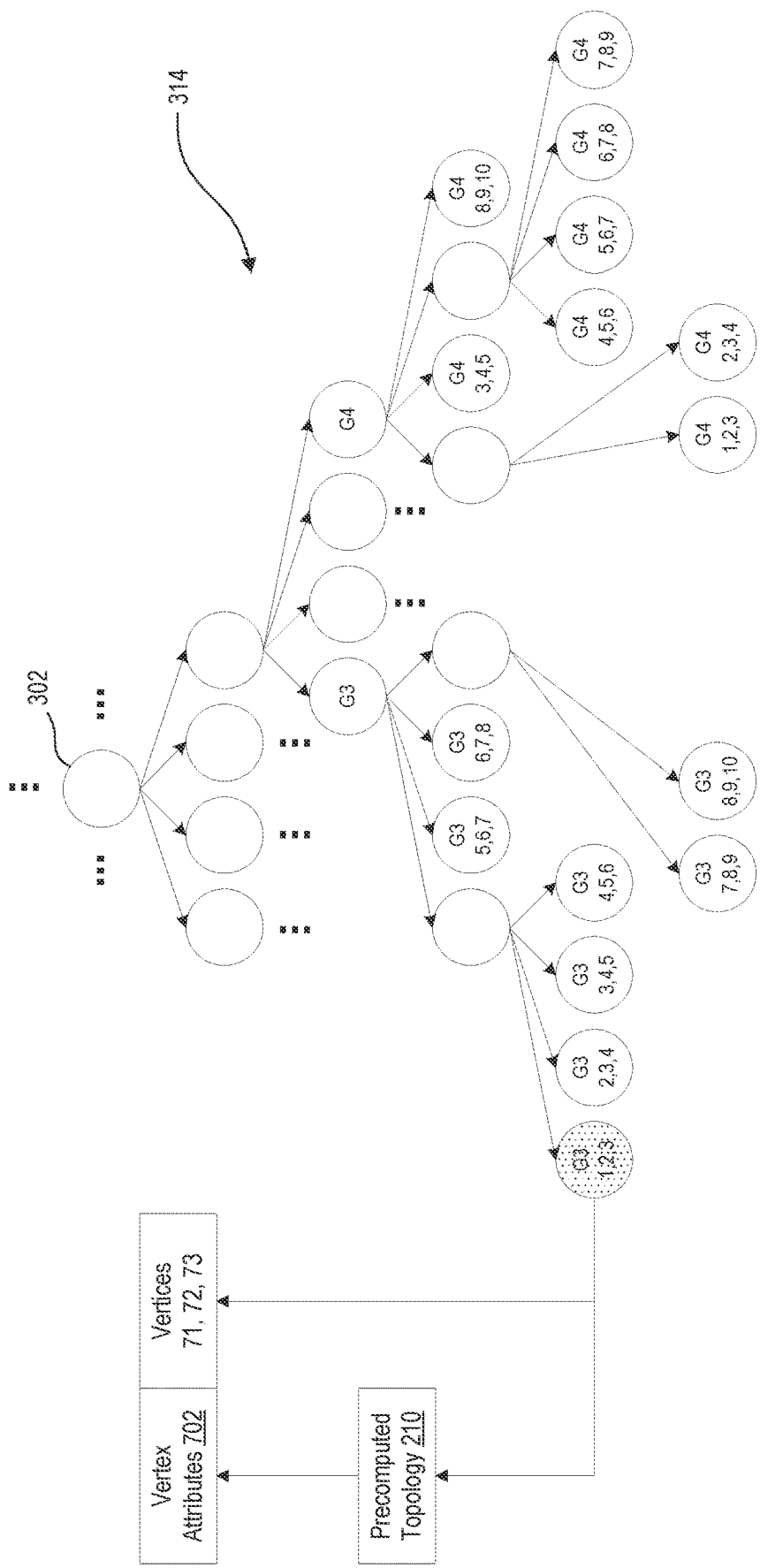
FIG. 7 illustrates a conceptual representation of using the precomputed topology of FIG. 2 to determine vertex attributes for an object component determined to be intersected by a ray.

To determine intersected object components for each ray, each ray may be tested against the acceleration structure 314 via node traversal until a leaf node is reached. FIG. 7 provides a conceptual representation of testing a ray against the acceleration structure 314 as represented in FIG. 5 (e.g., with the groups 306 of object components defined by the precomputed topology 210 represented in intermediate nodes of the acceleration structure 314). FIG. 7 illustrates an instance in which the tested ray is determined to intersect with the leaf node labeled "G3 1, 2, 3" (emphasized in FIG. 7 with a dot pattern), indicating that the ray intersects with the triangle of the mesh 204 of the virtual object 202 defined by the group vertices 1, 2, and 3 of group 3 of the precomputed topology 210. Vertices 1, 2, and 3 of group 3 correspond to vertices 71, 72, and 73 of the mesh 204 of the virtual object 202, as discussed hereinabove with reference to FIG. 2 (depicted in FIG. 7 with an arrow extending from "G3 1, 2, 3" to "Vertices 71, 72, 73").

In some implementations, once an intersected object component is found (e.g., the nearest intersected object component), the precomputed topology 210 is used to obtain vertex attributes (e.g., for configuring a display pixel to represent the intersected triangle of the virtual object 202, or for determining other visual characteristics for representing the virtual environment 300). For example, FIG. 7 conceptually depicts utilizing the precomputed topology 210 to determine vertex attributes 702 for the vertices associated with the intersected object component (e.g., vertices 71, 72, and 73 of the mesh 204 of the virtual object 202, which correspond to the group 3 vertices 1, 2, and 3 represented in the intersected leaf node labeled "G3 1, 2, 3"). As noted hereinabove with reference to FIG. 2, the precomputed topology 210 can map "Group Vertices" of an object component group defined in the precomputed topology 210 to "Mesh Vertices" defined by the mesh 204 as a whole. Accordingly, given the vertices of the intersected object component determined via traversal of the acceleration structure 314, the precomputed topology 210 can be used to determine vertex attributes 702 for the vertices of the intersected object component, as depicted in FIG. 7 with an arrow extending from the node labeled "G3 1, 2, 3" to the precomputed topology 210 and to vertex attributes 702. The vertex attributes 702 of the vertices of the intersected object component can be used to determine display characteristics for representing the intersected object component and/or other aspects of the virtual environment 300 in display imagery. Vertex attributes can include, by way of non-limiting example, normals, texture coordinates, color, tangent, bitangent, bone weights, bone indices, and/or others.

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

The acts described with reference to FIGS. 8, 9, and 10 can be performed using one or more components of one or more systems 100 described hereinabove with reference to FIG. 1, such as processor(s) 102, storage 104, sensor(s) 110, I/O system(s) 114, communication system(s) 116, remote system(s) 118, etc.

FIGS. 8, 9, and 10 illustrate example flow diagrams 800, 900, and 1000, respectively, depicting acts associated with building acceleration structures using precomputed topologies.

Act 802 of flow diagram 800 of FIG. 8 includes accessing a precomputed topology associated with a mesh of a virtual object for inclusion in a virtual environment, wherein the mesh comprises a plurality of object components, and wherein the precomputed topology defines a plurality of object component groups that each comprise a respective set of object components of the mesh. In some instances, each of the plurality of object components of the mesh comprises a triangle. In some implementations, each of the plurality of object component groups comprises a triangle fan or a triangle strip. In some examples, the precomputed topology is determined utilizing a greedy algorithm. In some instances, the precomputed topology is determined in accordance with a maximum size parameter for each of the plurality of object component groups.

Act 804 of flow diagram 800 includes determining a traversal likelihood metric associated with the mesh, wherein the traversal likelihood metric indicates a likelihood that one or more rays of a ray trace operation will traverse one or more acceleration structure nodes representing one or more object components of the mesh. In some implementations, the traversal likelihood metric is based on a distance between at least part of the mesh and a ray origin point associated with the ray trace operation. In some examples, the traversal likelihood metric is based on a quantity of rays determined to intersect with at least part of the mesh in one or more temporally preceding frames.

Act 806 of flow diagram 800 includes using the plurality of object component groups as inputs to construct an acceleration structure, wherein: (i) when the traversal likelihood metric satisfies a threshold, one or more leaf nodes of at least one intermediate node of the acceleration structure comprise a respective object component of an object component group of the plurality of object component groups, and (ii) when the traversal likelihood metric fails to satisfy the threshold, at least one leaf node of the acceleration structure comprises an object component group of the plurality of object component groups.

Act 808 of flow diagram 800 includes performing the ray trace operation by testing a plurality of rays against nodes of the acceleration structure to determine whether any of the plurality of rays intersect with any of the plurality of object components of the mesh.

Act 810 of flow diagram 800 includes, in response to determining that one or more rays intersect with one or more object components of the mesh, identifying vertex attributes associated with the one or more object components using the precomputed topology associated with the mesh.

Act 902 of flow diagram 900 of FIG. 9 includes accessing a precomputed topology associated with a mesh of a virtual object for inclusion in a virtual environment, wherein the mesh comprises a plurality of object components, and wherein the precomputed topology defines a plurality of object component groups that each comprise a respective set of object components of the mesh. In some instances, each of the plurality of object components of the mesh comprises a triangle. In some implementations, each of the plurality of object component groups comprises a triangle fan or a triangle strip. In some examples, the precomputed topology is determined utilizing a greedy algorithm. In some instances, the precomputed topology is determined in accordance with a maximum size parameter for each of the plurality of object component groups.

Act 904 of flow diagram 900 includes using the plurality of object component groups as inputs to construct an acceleration structure, wherein one or more leaf nodes of at least one intermediate node of the acceleration structure comprise a respective object component of an object component group of the plurality of object component groups.

Act 906 of flow diagram 900 includes performing a ray trace operation by testing a plurality of rays against nodes of the acceleration structure to determine whether any of the plurality of rays intersect with any of the plurality of object components of the mesh.

Act 908 of flow diagram 900 includes, in response to determining that one or more rays intersect with one or more object components of the mesh, identifying vertex attributes associated with the one or more object components using the precomputed topology associated with the mesh.

Act 1002 of flow diagram 1000 of FIG. 10 includes accessing a precomputed topology associated with a mesh of a virtual object for inclusion in a virtual environment, wherein the mesh comprises a plurality of object components, and wherein the precomputed topology defines a plurality of object component groups that each comprise a respective set of object components of the mesh. In some implementations, each of the plurality of object components of the mesh comprises a triangle. In some examples, each of the plurality of object component groups comprises a triangle fan or a triangle strip. In some instances, the precomputed topology is determined utilizing a greedy algorithm.

Act 1004 of flow diagram 1000 includes using the plurality of object component groups as inputs to construct an acceleration structure, wherein at least one leaf node of the acceleration structure comprises an object component group of the plurality of object component groups.

Act 1006 of flow diagram 1000 includes performing a ray trace operation by testing a plurality of rays against nodes of the acceleration structure to determine whether any of the plurality of rays intersect with any of the plurality of object components of the mesh.

Act 1008 of flow diagram 1000 includes, in response to determining that one or more rays intersect with one or more object components of the mesh, identifying vertex attributes associated with the one or more object components using the precomputed topology associated with the mesh.

Additional Details Related to the Disclosed Embodiments

Disclosed embodiments may comprise or utilize a special-purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "computer-readable recording media", "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry program code in the form of computer-executable instructions or data structures, and which can be accessed by a general-purpose or special-purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A system for building an acceleration structure using precomputed topologies, the system comprising:
   one or more processors; and
   one or more computer-readable recording media that store instructions that are executable by the one or more processors to configure the system to:
   access a precomputed topology associated with a mesh of a virtual object for inclusion in a virtual environment, wherein the mesh comprises a plurality of object components, and wherein the precomputed topology defines a plurality of object component groups that each comprise a respective set of object components of the mesh;
   determine a traversal likelihood metric associated with the mesh, wherein the traversal likelihood metric indicates a likelihood that one or more rays of a ray trace operation will traverse one or more acceleration structure nodes representing one or more object components of the mesh; and
   use the plurality of object component groups as inputs to construct an acceleration structure, wherein:
   when the traversal likelihood metric satisfies a threshold, one or more leaf nodes of at least one intermediate node of the acceleration structure comprise a respective object component of an object component group of the plurality of object component groups, and
   when the traversal likelihood metric fails to satisfy the threshold, at least one leaf node of the acceleration structure comprises an object component group of the plurality of object component groups.

2. The system of claim 1, wherein each of the plurality of object components of the mesh comprises a triangle.

3. The system of claim 2, wherein each of the plurality of object component groups comprises a triangle fan or a triangle strip.

4. The system of claim 3, wherein the precomputed topology is determined utilizing a greedy algorithm.

5. The system of claim 3, wherein the precomputed topology is determined in accordance with a maximum size parameter for each of the plurality of object component groups.

6. The system of claim 1, wherein the traversal likelihood metric is based on a distance between at least part of the mesh and a ray origin point associated with the ray trace operation.

7. The system of claim 1, wherein the traversal likelihood metric is based on a quantity of rays determined to intersect with at least part of the mesh in one or more temporally preceding frames.

8. The system of claim 1, wherein the instructions are executable by the one or more processors to further configure the system to:
   perform the ray trace operation by testing a plurality of rays against nodes of the acceleration structure to determine whether any of the plurality of rays intersect with any of the plurality of object components of the mesh.

9. The system of claim 8, wherein the instructions are executable by the one or more processors to further configure the system to:

in response to determining that one or more rays intersect with one or more object components of the mesh, identify vertex attributes associated with the one or more object components using the precomputed topology associated with the mesh.

10. A system for building a ray tracing acceleration structure using precomputed topologies, the system comprising:
one or more processors; and
one or more computer-readable recording media that store instructions that are executable by the one or more processors to configure the system to:
access a precomputed topology associated with a mesh of a virtual object for inclusion in a virtual environment, wherein the mesh comprises a plurality of object components, and wherein the precomputed topology defines a plurality of object component groups that each comprise a respective set of object components of the mesh, wherein the precomputed topology comprises a mapping of group vertices of the plurality of object component groups to mesh vertices of the mesh, wherein the group vertices comprise vertex indices defined for the plurality of object component groups, and wherein the mesh vertices comprise vertex indices defined by the mesh;
use the plurality of object component groups as inputs to construct an acceleration structure, wherein one or more leaf nodes of at least one intermediate node of the acceleration structure comprise a respective object component of an object component group of the plurality of object component groups;
perform a ray trace operation by testing a plurality of rays against nodes of the acceleration structure to determine whether any of the plurality of rays intersect with any of the plurality of object components of the mesh; and
in response to determining that one or more rays intersect with one or more object components of the mesh, identify vertex attributes associated with the one or more object components using the precomputed topology associated with the mesh, wherein the vertex attributes provide display characteristics for displaying the virtual environment.

11. The system of claim 10, wherein each of the plurality of object components of the mesh comprises a triangle.

12. The system of claim 11, wherein each of the plurality of object component groups comprises a triangle fan or a triangle strip.

13. The system of claim 12, wherein the precomputed topology is determined utilizing a greedy algorithm.

14. The system of claim 12, wherein the precomputed topology is determined in accordance with a maximum size parameter for each of the plurality of object component groups.

15. A system for building an acceleration structure using precomputed topologies, the system comprising:
one or more processors; and
one or more computer-readable recording media that store instructions that are executable by the one or more processors to configure the system to:
access a precomputed topology associated with a mesh of a virtual object for inclusion in a virtual environment, wherein the mesh comprises a plurality of object components, and wherein the precomputed topology defines a plurality of object component groups that each comprise a respective set of object components of the mesh, wherein the precomputed topology comprises a mapping of group vertices of the plurality of object component groups to mesh vertices of the mesh, wherein the group vertices comprise vertex indices defined for the plurality of object component groups, and wherein the mesh vertices comprise vertex indices defined by the mesh;
use the plurality of object component groups as inputs to construct an acceleration structure, wherein at least one leaf node of the acceleration structure comprises an object component group of the plurality of object component groups
perform a ray trace operation by testing a plurality of rays against nodes of the acceleration structure to determine whether any of the plurality of rays intersect with any of the plurality of object components of the mesh; and
in response to determining that one or more rays intersect with one or more object components of the mesh, identify vertex attributes associated with the one or more object components using the precomputed topology associated with the mesh, wherein the vertex attributes provide display characteristics for displaying the virtual environment.

16. The system of claim 15, wherein:
each of the plurality of object components of the mesh comprises a triangle,
each of the plurality of object component groups comprises a triangle fan or a triangle strip, and
the precomputed topology is determined utilizing a greedy algorithm.

* * * * *